United States Patent [19]

Foltz et al.

[11] Patent Number: 5,460,284

[45] Date of Patent: Oct. 24, 1995

[54] CAPTURE SYSTEM EMPLOYING ANNULAR FLUID STREAM

[75] Inventors: Robert S. Foltz, Rochester; Ronald A. Gaither, Fairport; Richard C. Petralia, Rochester, all of N.Y.

[73] Assignee: Xerox Corporation, Stamford, Conn.

[21] Appl. No.: 222,159

[22] Filed: Apr. 1, 1994

[51] Int. Cl.$^6$ ............... B05D 3/06; H01L 21/306; B23K 26/00; A47L 5/14

[52] U.S. Cl. ............... 216/65; 216/8; 216/25; 216/66; 156/643.1; 427/555; 427/534; 427/552; 15/302; 15/312.1; 15/345; 137/814; 239/106; 239/433; 219/121.66; 219/121.69; 219/121.84

[58] Field of Search ............... 427/534, 551, 427/552, 553, 554, 555, 557, 558; 156/643, 628, 638, 639, 640, 641, 645, 646, 647, 643.1, 628.1, 638.1, 639.1, 640.1, 645.1, 646.1, 647.1; 15/104.4, 104.9, 302, 312, 321, 345, 348, 352, 353, 312.1; 137/13, 14, 237, 814; 239/106, 61, 433, 434; 219/121.66, 121.69, 121.84, 121.85; 216/8, 9, 10, 25, 65, 24, 66

[56] References Cited

U.S. PATENT DOCUMENTS

| | | | |
|---|---|---|---|
| 4,161,281 | 7/1979 | Erb et al. | 239/434 |
| 4,339,655 | 7/1982 | Lauroesch | 219/121.84 |
| 4,526,322 | 7/1985 | Voorheis | 239/433 |
| 4,671,848 | 6/1987 | Miller et al. | 156/643 |
| 4,792,094 | 12/1988 | Tachi et al. | 239/106 |
| 4,877,644 | 10/1989 | Wu et al. | 427/53.1 |
| 4,981,722 | 1/1991 | Möller et al. | 427/569 |
| 4,995,119 | 9/1990 | Lantzer | 156/643 |
| 5,071,485 | 12/1991 | Matthews et al. | 156/640 |
| 5,087,323 | 7/1992 | Park | 156/640 |
| 5,164,567 | 11/1992 | Gettemy | 219/121.72 |
| 5,359,176 | 10/1994 | Balliet, Jr. et al. | 219/121.84 |
| 5,397,512 | 3/1995 | Sloane, Jr. et al. | 219/121.69 |
| 5,418,349 | 5/1995 | Swain et al. | 219/121.84 |

FOREIGN PATENT DOCUMENTS

| | | |
|---|---|---|
| 3144458 | 6/1991 | Japan. |
| 3194131 | 2/1993 | Japan. |

OTHER PUBLICATIONS

"Lift–off Stencil Created by Laser Ablation", IBM Technical Disclosure Bulletin, vol. 28, No. 5, Oct. 1985, p. 2034.

*Primary Examiner*—Marianne Padgett
*Attorney, Agent, or Firm*—Zosan S. Soong

[57] ABSTRACT

A method and apparatus are disclosed for capturing coating debris during laser ablation of a photoreceptor comprising: (a) enclosing a predetermined length of a coated substrate in a housing to result in an enclosed coated substrate portion, wherein there exists a gap between the enclosed substrate portion and the housing in communication with air outside the housing; (b) directing high energy radiation at the coating of the enclosed substrate portion; (c) directing a first fluid stream against the coating of the enclosed substrate portion to remove at least part of the coating in the form of coating debris during or subsequent to (b), whereby the first fluid stream may move a portion of the coating debris outside the housing in the absence of (d); (d) directing an annularly-shaped second fluid stream against the first fluid stream in a direction effective for keeping the coating debris inside the housing, thereby minimizing movement of the coating debris into the air outside the housing; and (e) exhausting the coating debris.

10 Claims, 9 Drawing Sheets

FIG. 11
view a-a

CAPTURE SYSTEM EMPLOYING ANNULAR FLUID STREAM

CROSS-REFERENCE TO RELATED COPENDING APPLICATIONS

Attention is directed to the following related copending applications, all filed concurrently with the instant application:

Robert S. Foltz et al., "Capture System Employing Diverter Fluid Nozzle" (Ser. No. 08/222,158 or Attorney Docket No. D/94025 filed Apr. 1, 1994), the disclosure of which is totally incorporated by reference; and Robert S. Foltz et al., "Laser Ablation Nozzle" (Ser. No. 08/221,955 or Attorney Docket No. D/93419 filed Apr. 1, 1994), the disclosure of which is totally incorporated by reference.

BACKGROUND OF THE INVENTION

This invention relates generally to a method and apparatus for capturing coating debris during removal of layered material from a substrate, and more specifically to a method and apparatus for employing a laser to remove the coating from the ends of a photoreceptor while capturing the resulting coating debris, thereby minimizing redeposition of the coating material on the photoreceptor and ensuring a safe work environment. The phrase coating debris includes particulate matter and fumes resulting from the removal process.

In electrophotography, and particularly in xerographic copying machines, coated substrates such as photoreceptor belts or cylindrical photoreceptor drums are common. Photoreceptor embodiments include at least one coating of photosensitive material, which can be formed on the photoreceptor by known techniques such as immersion or dip coating.

The peripheral ends of a coated photoreceptor are used to engage with flanges in a copier's drive mechanism and/or to support a developer housing. If the developer housing rides on the coated area at one end of the drum, the coating material is rubbed off and contaminates various components in the machine such as the cleaning system and any optical exposure systems employed in the machine. Also, the coating can interfere with devices that are designed to electrically ground the drum by merely riding on the outer surface at one end of the drum. Thus, both the outer and inner peripheral ends of a photoreceptor must be free of coating material.

Conventionally, the ends of a photoreceptor are masked before coating to prevent them from being coated. In dip coating, the upper end of the photoreceptor drum might be kept free of coating material by orienting the drum vertically and dipping the drum into a bath of coating material to a predetermined depth. However, the coating formed over the lower end of the photoreceptor must still be removed, usually by mechanically wiping the lower end and/or by applying solvents to it. Chemical treatments can cause solvent droplets or vapor to contact the coating in regions that are not intended to be removed, reducing the quality of the resulting photoreceptor. In addition, the initial cost of the solvent, and cost of solvent recovery can be very high. Moreover, where the coatings may contain different layers of different materials, different solvents may be required to remove different layers. This adds to the complexity of removal of photoconductive coatings with the aid of a solvent because each layer has to be separately treated with different solvent. Furthermore, organic solvents have a limited useful life and can be hazardous to work with. Mechanical techniques for removing coatings are cumbersome, inefficient, and often produce photoreceptors of unacceptable quality.

Japanese Publication No. 3-144,458 discloses a process that attempts to remove coatings from the ends of a photoreceptor without mechanical or chemical treatment. A laser beam from an yttrium-aluminum-garnet laser is irradiated at the end portions of a photoreceptor drum to burn or sublimate the photoreceptor coating.

Japanese Publication No. 3-194,131 discloses a similar process in which laser energy is directed at the ends of a photoreceptor in an effort to completely remove the coating.

U.S. Pat. No. 4,877,644 to Wu et al., issued Oct. 31, 1989—A method for the selective plating of a metal substrate on which a thin polymeric resist is first applied, followed by the selective removal of the resist to expose portions of the substrate to plating, and plating. More particularly, the method includes the steps of selecting a laser wavelength which couples well to the metal substrate, choosing a polymer based plating resist having a low optical coefficient of absorption at the wavelength, curing the resist, subjecting selective areas of the resist to a single excimer laser shot, having a short wavelength, to cause ablative removal of the resist over selective areas of the substrate, and subjecting the exposed portions of the substrate to metal plating.

U.S. Pat. No. 4,671,848 to Miller et al., issued Jun. 9, 1987—a method for removing a dielectric coating from a conducting material is disclosed, wherein a high energy radiation source, such as a laser source, is focused in a region having a predefined relationship with the coating of the conducting material. The focused radiation results in a plasma or ionized region being formed. The coating in the vicinity of the plasma region is removed. The region of the focusing of the radiation is varied spatially to remove the dielectric coating in a pre-selected region of the conducting material. According to one embodiment, the radiation is focused in a region spatially removed from the conducting material in order that the direct radiation does not directly impact the conducting material.

U.S. Pat. No. 5,164,567 to Gettemy, issued Nov. 17, 1992—A method of cutting with a laser beam is disclosed where an oxygen-hydrocarbon reaction is used to provide auxiliary energy to a metal workpiece to supplement the energy supplied by the laser. Oxygen is supplied to the laser focus point on the workpiece by a nozzle through which the laser beam also passes.

LIFT-OFF STENCIL CREATED BY LASER ABLATION, IBM Technical Disclosure Bulletin, Vol. 28, No. 5, October 1985, page 2034—a system is disclosed for ablating polymeric materials to create holes, vias, or lift-off stencils having a finite taper.

Copending patent application U.S. Ser. No. 08/178,166 (Attorney Docket No. D/93247), filed Jan. 6, 1994, the disclosure of which is totally incorporated by reference, discloses a laser ablation system employing an annular compressed fluid curtain to assist in removal of a coating. There is also disclosed an annular nozzle coaxial with a coated substrate to supply a high pressure annular curtain of compressed fluid at an angle to the coated cylinder to assist in removal of a coating.

Copending patent application U.S. Ser. No. 08/071,087 (Attorney Docket No. D/89426), filed Jun. 4, 1993, which is totally incorporated by reference, discloses a process for treating a predetermined portion of a coating on a photoreceptor to remove at least part of the coating. The process involves directing a source of high energy irradiation at the coating in the presence of at least one fluid medium to remove at least part of the coating from the predetermined portion of the coating. The source of high energy irradiation is preferably a laser beam, ultrasonic energy, or a source of high intensity heat. The at least one fluid medium is preferably at least one gas jet, liquid jet or a liquid solvent. There are disclosed a fluid coaxial jet and a fluid cross-jet.

Although laser treatment processes are intended to completely remove coatings, it has been found that many materials commonly used in photoreceptor coatings are melted, rather than vaporized, by these processes. The molten coating subsequently hardens and is removed as a dusty debris by associated fluid jets.

SUMMARY OF THE INVENTION

It is an object of the instant invention to capture coating debris resulting from the removal of a portion of the coating from a photoreceptor to minimize redeposition of coating debris on the photoreceptor and to ensure a safe work environment relatively free of coating debris.

These objects and others are accomplished in embodiments by providing a method comprising:

(a) enclosing a predetermined length of a coated substrate in a housing to result in an enclosed coated substrate portion, wherein there exists a gap between the enclosed substrate portion and the housing in communication with air outside the housing;

(b) directing high energy radiation at the coating of the enclosed substrate portion;

(c) directing a first fluid stream against the coating of the enclosed substrate portion to remove at least part of the coating in the form of coating debris during or subsequent to (b), whereby the first fluid stream may move a portion of the coating debris outside the housing in the absence of (d);

(d) directing an annularly-shaped second fluid stream against the first fluid stream in a direction effective for keeping the coating debris inside the housing, thereby minimizing movement of the coating debris into the air outside the housing; and (e) exhausting the coating debris.

In embodiments of the instant invention, there is further provided an apparatus comprising:

(a) a housing defining an opening in a side of the housing in communication with a chamber suitable for enclosing a predetermined length of a coated substrate to result in an enclosed coated substrate portion, wherein there exists a gap between the enclosed substrate portion and the housing in communication with air outside the housing;

(b) a first fluid stream nozzle for directing a first fluid stream against the coating of the enclosed substrate portion to remove at least part of the coating in the form of coating debris during or subsequent to exposure of the coating of the enclosed substrate portion to high energy radiation, whereby the first fluid stream may move a portion of the coating debris outside the housing in the absence of (c);

(c) a second fluid stream nozzle, coupled to the housing, comprising:

(i) an opening sized to admit the substrate which is defined by the second nozzle and extending through the second nozzle in communication with the chamber of the housing, (ii) a first orifice defined by the second nozzle in communication with the second nozzle opening, and annularly disposed around the second nozzle opening, and (iii) a first passageway defined by the second nozzle in communication with the first orifice and annularly disposed around the second nozzle opening, wherein the portion of the first passageway adjacent the first orifice forms an angle $\theta_1$ with the surface of the substrate, wherein the angle $\theta_1$ is effective for directing an annular-shaped second fluid stream through the first orifice against the first fluid stream to keep the coating debris inside the housing, thereby minimizing movement of the coating debris into the air outside the housing; and (d) exhausting apparatus coupled to the housing to remove the coating debris.

BRIEF DESCRIPTION OF THE DRAWINGS

Other aspects of the present invention will become apparent as the following description proceeds and upon reference to the Figures which represent preferred embodiments.

Unless otherwise noted, the same reference numerals in the Figures refer to the same or similar features.

DETAILED DESCRIPTION

The invention relates to a method and apparatus for capturing coating debris during removal of the coating from for example a photoreceptor. A predetermined portion of a coating on a photoreceptor is treated to remove at least part of the coating by directing high energy radiation such as a laser beam and a number of fluid jets at the coating to remove at least part of the coating. This process will be referred to as "laser ablation." The laser ablation process functions to effectively remove at least part of a predetermined portion of a coating without the need for chemical or mechanical treatments. The process is useful for treating cylindrical photoreceptor drums.

Figure 1:
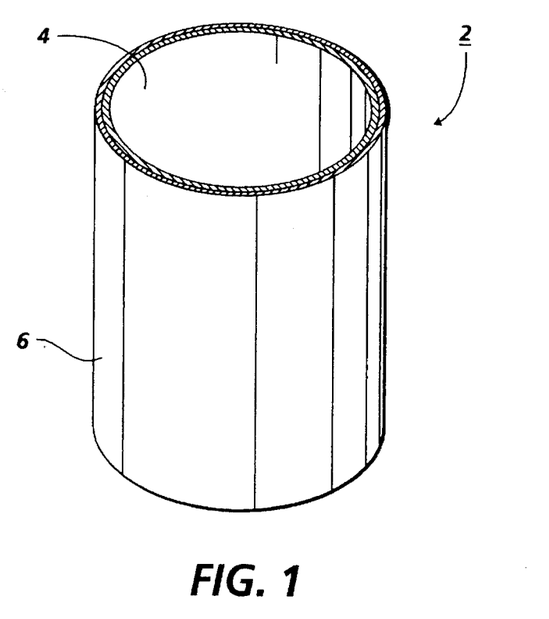
FIG. 1 shows a cylindrical photoreceptor having an outer coating to be treated according to one embodiment of the invention.

For purposes of illustration, the process according to the invention will be described with reference to the treatment of a coated cylindrical photoreceptor. Referring to FIG. 1, a partially processed photoconductor drum 2 is shown. Drum 2 includes a rigid cylindrical substrate 4 having an outer coating 6 formed over the substrate. Substrate 4 can be made of any suitable material such as aluminum, nickel, zinc, chromium, conductive paper, stainless steel, cadmium, titanium, metal oxides, polyesters such as MYLAR®, and the like. Substrate 4 can be formed as one layer or as a plurality of layers, for example as a conductive layer coated over an insulating layer. The thickness of substrate 4 can vary widely depending on the intended use of the photoreceptor, and preferably is from about 65 micrometers to about 5 millimeters thick, most preferably from about 0.05 millimeter to about 2 millimeters thick.

The process removes various types of known photoreceptor coatings. Coating 6 can include one or a plurality of layers, and typically will include multiple layers such as an electrically conductive ground plane, a blocking layer, an adhesive layer, a charge generating (photogenerating) layer, a charge transporting layer and an overcoat layer. The process removes at least part of one coating layer. Preferably, all of the coating layers present at the outer and inner peripheral end regions of the photoreceptor are removed. In embodiments of the present invention, the coating along the entire length of the photoreceptor may be removed.

The layers of coating 6 are formed using well known techniques and materials. For example, coating 6 can be applied to substrate 4 by vacuum deposition, immersion, spray coating, or dip coating. Dip coating or spray coating are preferred. Suitable coating techniques and materials are illustrated in U.S. Pat. Nos. 5,091,278, 5,167,987 and 5,120,628, the entire disclosures of which are totally incorporated herein by reference. The process of the invention can be carried out in conjunction with the coating process, after the coating has partially hardened. Preferably, laser ablation is performed after the coating has substantially or fully hardened.

Coating 6 preferably includes, as a photoconductive material, one or a plurality of layers of selenium, metal alloys, and/or organic resins carrying photoconductive materials. Organic photoconductor coatings are preferred. Such coatings include a photoconductive material such as pigments including dibromoanthanthrone, metal-free and metal phthalocyanines, halogenated metal phthalocyanines, perylenes, and azo pigments, carried in a suitable organic binder resin. Examples of useful organic binder resins include polycarbonates, acrylate polymers, vinyl polymers, cellulose polymers, polysiloxanes, polyamides, polyurethanes, polyesters, and block, random or alternating copolymers thereof.

Figure 2:
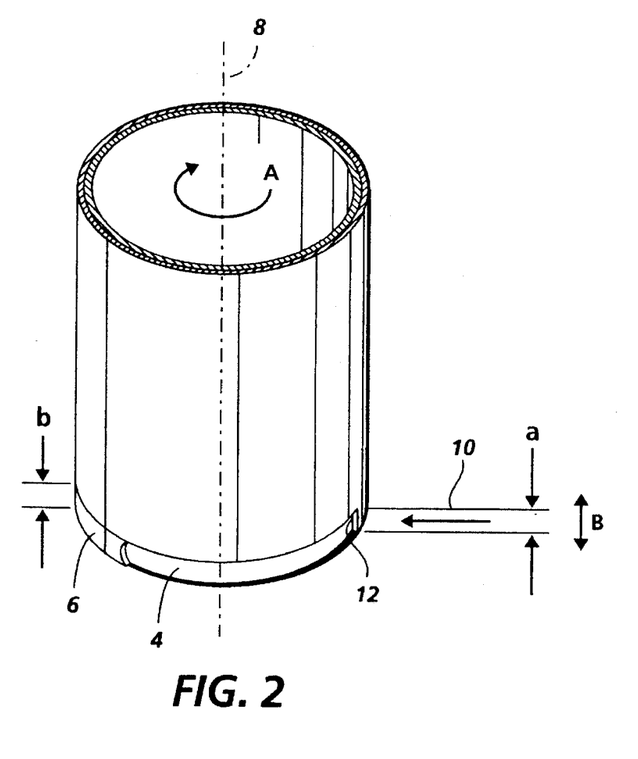
FIG. 2 illustrates the removal of a portion of the coating using laser radiation according to one embodiment of the invention.

Referring to FIG. 2, drum 2 is mounted such that its longitudinal axis 8 is vertically or horizontally oriented. Drum 2 is preferably mounted using a conventional chucking device coupled to a drive (not shown), so that drum 2 can be rotatably driven about longitudinal axis 8 in the direction of arrow A. The photoreceptor is preferably rotated about axis 8 during the removal of the coating. A rotational speed of from about 400 rpm to about 4000 rpm is preferred.

As drum 2 is rotated, a laser beam 10 of width "a" from a conventional $CO_2$ laser (not shown) is directed at a predetermined portion of coating 6. The laser used in the process is preferably a continuous wave carbon dioxide laser. $CO_2$ lasers provide a laser beam having a wavelength that is particularly well absorbed by plastic binder resins commonly present in one or more layers of known photoreceptors. A $CO_2$ laser emitting a beam at a wavelength of about 10.6 micrometers has been found to work well for organic photoconductor films having polycarbonate binders. Carbon dioxide continuous wave lasers are commercially available and require no special modification to be effective in carrying out the ablation. Alternately, among others, a pulsed beam $CO_2$ laser, yttrium aluminum garnet (YAG) laser, or excimer laser could be used to carry out the laser ablation process.

The laser should have sufficient power to remove a desired amount of the particular coating to be treated. The power of the $CO_2$ laser should be selected depending on the type of substrate present in the photoreceptor. Where the photoreceptor includes an aluminum substrate, a laser having a power of from about 800 W to about 2000 W, more preferably from about 1000 W to about 1500 W, has been found to provide preferred results. With a nickel substrate, a laser having a power of from about 100 W to about 400 W is preferred.

The laser beam should have a sufficient watt density to ablate the photoreceptor coating. An optical system is preferably used to concentrate the laser beam and provide the required watt density for a particular photoreceptor coating. However, laser beam systems are available that may not require an optical system to provide a laser beam having a sufficient watt density to ablate a photoreceptor coating. The focal length, focus, and angle of incidence of the laser affect the laser ablation process, and can be selected depending on the particular coating and the results intended. A focal length of about 5 inches and a surface focus or slightly off-surface focus are preferred. Most preferably, the laser has a focus tolerance of about ±0.75 mm from the point of sharp focus, in either direction.

The predetermined portion of coating 6 to be treated has a desired width "b". To provide a suitable coating free area to support a developer housing or flange for a drive mechanism, width "b" is typically about 1 cm wide. The process could be used to ablate other widths of a photoreceptor coating. It may also be desirable to remove bands of the coating in one or more locations on the photoreceptor, or to remove circular or other shaped patterns of the coating.

At a given moment during laser ablation, laser beam 10 impinges on a spot 12 such that at least part of the coating material in the area of spot 12 is rapidly heated and vaporized by laser beam 10. Part of coating 6 is typically melted by laser beam 10; this molten coating material is forced off of drum 2 by the action of a cross-jet fluid.

One fluid jet used in the ablation process is a cross-jet of fluid. Another fluid jet used with the ablation process is coaxial with the laser beam. A combination of the two is preferred for laser ablation. Conventional apparatus for supplying cross and coaxial fluid jets, which are commercially available, may be employed in embodiments of the instant invention. The laser vaporizes and removes at least part of the coating. As discussed above, the laser will often melt but not vaporize certain other materials in the coating. By applying a high velocity stream of cross-jet fluid to the coating during laser treatment, the molten coating material is forced off the photoreceptor in a controlled manner. This permits all of the coating material to be removed from the predetermined region of the photoreceptor coating, without subsequent chemical or mechanical treatment. Cross-jet gas preferably has a pressure of from about 20 psi to about 400 psi, more preferably from about 100 psi to about 300 psi.

The supplying of a coaxial fluid jet around the laser beam during laser treatment prevents debris from backing up into the laser during the ablation process. The coaxial fluid jet travels around the outside of the laser beam in the same direction as the beam. This protects the laser and increases the online production time of the laser ablation system. A coaxial gas jet preferably has a pressure in the range of from about 5 psi to about 150 psi, more preferably from about 20 psi to about 60 psi, measured near the point at which the gas exits from the jet nozzle. It will be understood that the pressure of the gas can be varied by controlling the nozzle orifice size and the speed of the gas exiting the gas jet nozzle. A suitable nozzle diameter is about 1.5 mm, but various diameters are useful. Preferably, the process uses both cross and coaxial gas jets.

The gas used in the cross-jet and/or coaxial jet is preferably air, but can be other gases such as nitrogen gas or pure oxygen gas, depending on the coating material and other laser ablation conditions. For example, if a highly reactive or potentially explosive coating is to be removed, an inert cross-jet or coaxial jet gas such as nitrogen gas can be used. Conversely, if additional oxidation of the coating during the laser ablation process is desired, pure oxygen gas or other reactive gas mixtures can be used.

In an alternative embodiment, a liquid cross-jet could be used to assist the removal of the ablated photoreceptor coating. The liquid jet should have an orientation and pressure sufficient to impart about the same pressure on the ablated coating as the cross-jet gas described above.

As drum 2 rotates during the laser ablation process, a circumferential strip of coating material 6 substantially the same width as the width "a" of the laser beam is removed, exposing the underlying cylindrical photoreceptor substrate 4. The laser and gas jets are directed at the predetermined portion of coating 6 until the intended amount of coating has been removed.

The laser beam can have a width equal to the predetermined portion to be treated, or it can be narrower, in which case the laser beam is preferably translated across the width of the predetermined portion of the coating during the rotation of the photoreceptor. In a preferred embodiment, the width "a" of laser beam 10 is less than the width "b" of the predetermined portion of coating 6 to be treated. The laser source is mounted on a carriage (not shown) so as to be reciprocatable parallel to axis 8 during rotation of drum 2. To ablate the coating, as drum 2 rotates, laser beam 10 and the coaxial and cross-jet fluids are impinged on the inboard edge of the circumferential strip and then translated toward the bottom edge of photoreceptor drum 2, so as to cover the width "b" of the predetermined portion of coating 6. Alternately, laser beam 10 and the fluid jets can be translated from the outer edge of drum 2 toward the inboard edge of the circumferential strip. Preferably, laser ablation begins at the inboard edge of the predetermined portion of the coating to be removed, and the laser beam is translated toward the end of the photoreceptor. The coaxial fluid jet, if used, moves with the laser beam as the beam is translated over the photoreceptor coating. The cross-jet of fluid, if used, can be moved with the laser beam, or it can be maintained in a stationary position. The fluid jets are preferably directed at the photoreceptor to push the ablated coating off the end of the photoreceptor during the treatment. This helps prevent the ablated coating material from resettling on the untreated portion of the coating. A suction exhaust system (not shown) is preferably used to help capture the particulate debris and remove it from the treatment area. The fluid stream from the cross-jet nozzle and the fluid stream introduced coaxially with the laser beam collide with each other and with the surface of the photoreceptor to create turbulence. In the absence of the instant invention, the turbulence can carry some of the particles of ablated coating material removed from the drum onto areas of the photoreceptor coating that is to be subsequently used for electrophotographic imaging. The coating debris which settles on the imaging regions of the photoreceptor causes defects in final xerographic images formed during the electrophotographic imaging process. Thus, an additional cleaning operation may be needed to remove the debris in the absence of the instant invention.

The translation speed of laser beam 10 preferably is from about 0.25 millimeter per second to about 12.5 millimeters per second. A single pass over the coating is preferred. Laser beam 10 can be translated across the width "b" of the predetermined portion of coating 6 more than once if needed to remove coating material not removed by the first pass of the laser beam.

Optionally, if laser beam 10 has a width "a" less than the width "b" of the circumferential strip, laser beam 10 can be rapidly oscillated up and down in the directions of arrow B to cover the desired width "b" of coating 6 with the laser beam at spot 12.

Figure 3:
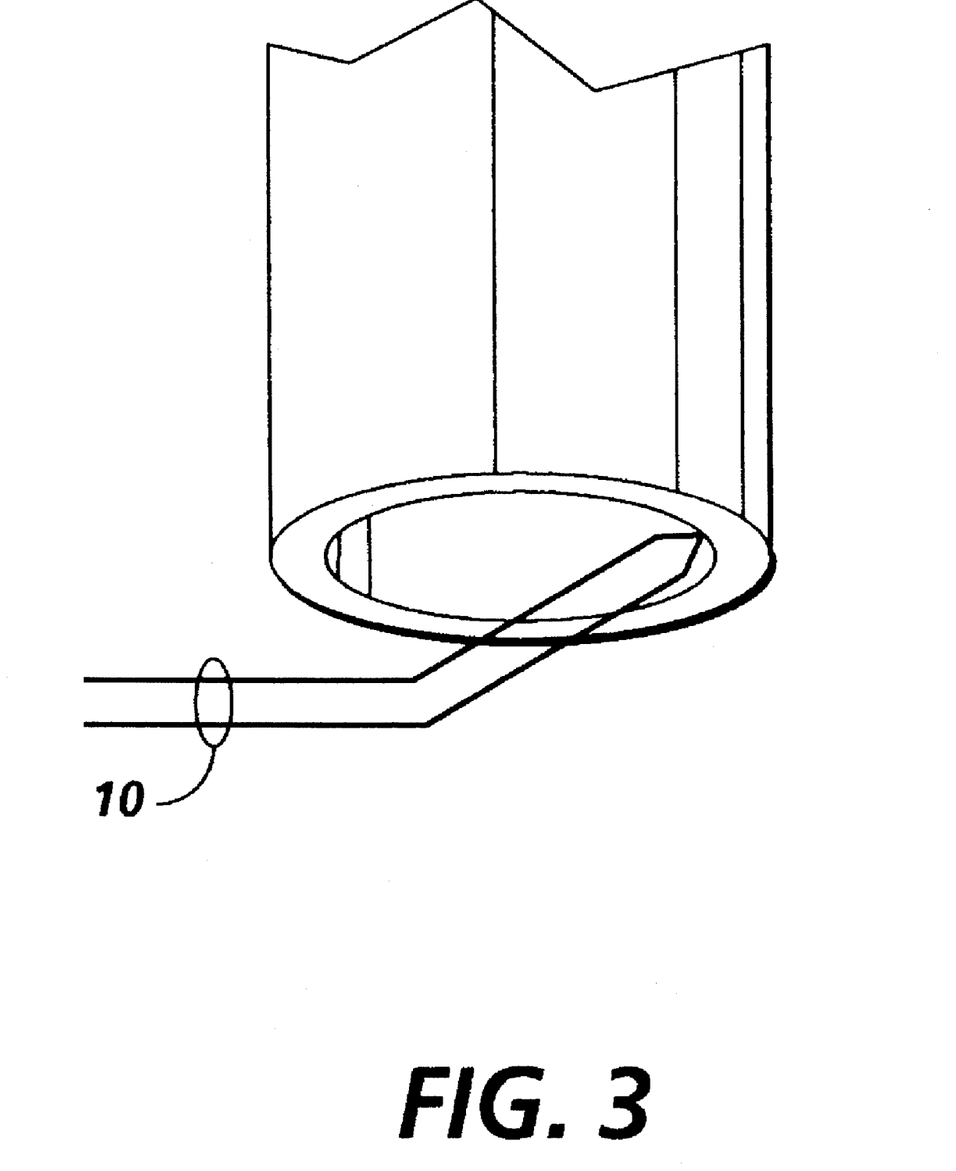
FIG. 3 is a partial plan view showing the removal of a coating from an inner portion of a cylindrical photoreceptor according to one embodiment of the invention.

When the desired amount of coating 6 has been removed from the outer predetermined surface(s) of drum 2, the laser and fluid jets can be stopped and reoriented to impinge upon any selected inner surface(s) of drum 2. In the case of a cylindrical photoreceptor, the outer and inner peripheral surfaces of the photoreceptor are preferably treated to remove the coating from the photoreceptor. FIG. 3 is a partial plan view showing the removal of a coating by laser beam 10 from an inner portion of a cylindrical photoreceptor according to the laser ablation embodiment of the invention. Once the inner and/or outer predetermined portions have been treated, the process is stopped and drum 2 is removed from the chucking device for further processing or use.

Figure 4:
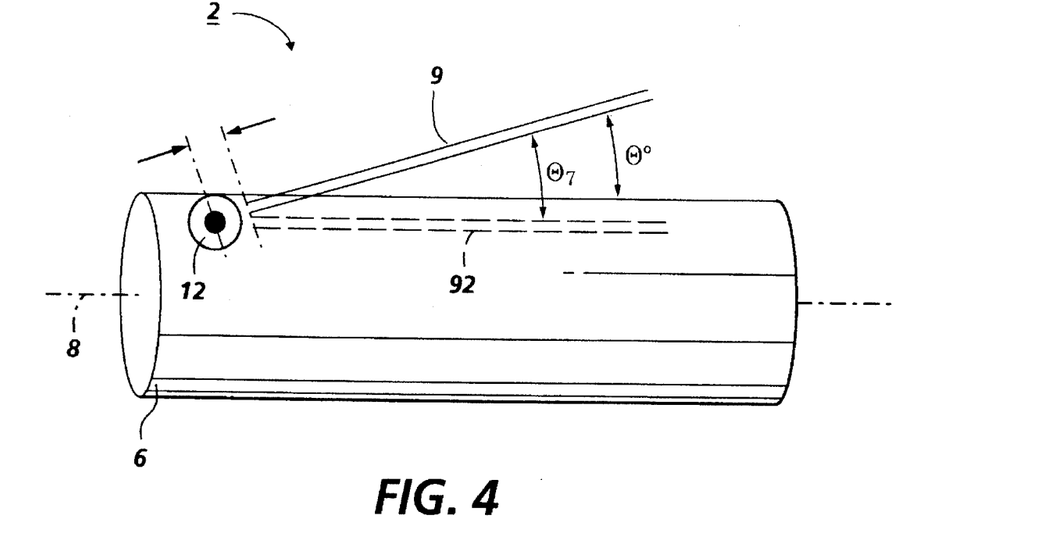
FIG. 4 shows a cross-jet for a fluid.

FIG. 4 shows a side view of drum 2 being laser ablated at spot 12 on coating 6. A high velocity cross-jet fluid 9 is directed at spot 12 to force molten coating material off the end of drum 2. As shown, cross-jet fluid 9 may be oriented at an angle θ° from the outer surface of coating 6. The angle θ° of orientation of cross-jet fluid 9 may range for example from about 0° to about 90° from the surface of coating 6, most preferably from about 15° to about 45°. The cross-jet fluid also has an angle $\theta_7$ associated with it, measured from the imaginary line 92 which represents the line on the surface of drum 2 which is parallel to the longitudinal axis 8 and which includes spot 12. This angle $\theta_7$ may range for example from about 15° to about 60°, preferably from about 30° to about 45°, and especially about 45°. In embodiments, the cross-jet fluid may be directed from an ablation nozzle which comprises a plurality of orifices on its bottom surface. One or two cross-jets may be directed at the drum 2 from the nozzle; a coaxial fluid stream is directed out of one of the orifices. Further details of the ablation nozzle are disclosed herein. In embodiments, the nozzle for the cross-jet fluid may be separated from or distinct from the nozzle for the co-axial fluid.

Figure 5:
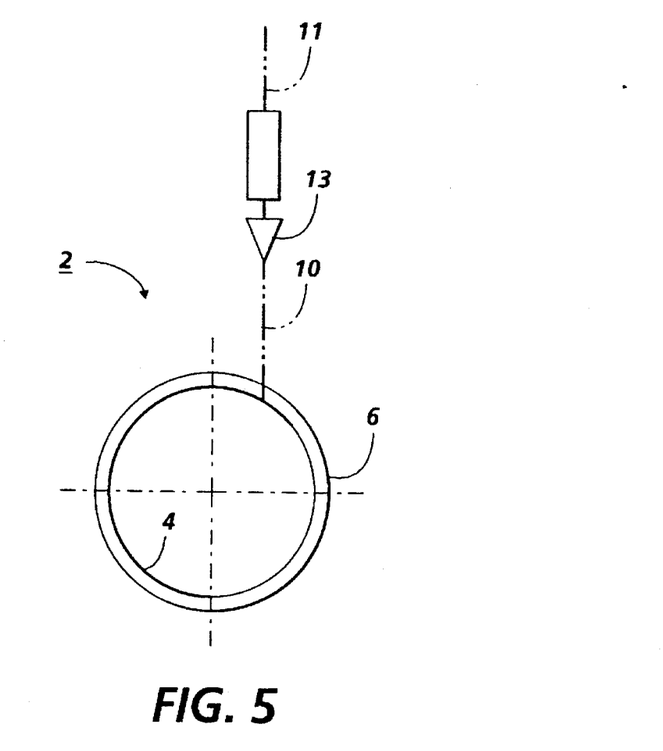
FIG. 5 illustrates a preferred orientation of laser ablation.

FIG. 5 illustrates a preferred laser orientation. Laser beam nozzle 13 is preferably oriented along axis 11 which is coincident with beam 10 such that laser beam 10 intersects both coating 6 and substrate 4. The laser beam can be directed at the coating at various angles to provide an adequate absorption of the laser energy by coating 6. Absorption of the laser energy by substrate 4 should be minimized. Also, the laser beam should not be directed along a diameter of photoreceptor 2 because this may cause the laser beam to reflect off of substrate 4 directly back into the laser, possibly damaging the laser.

Figure 6:
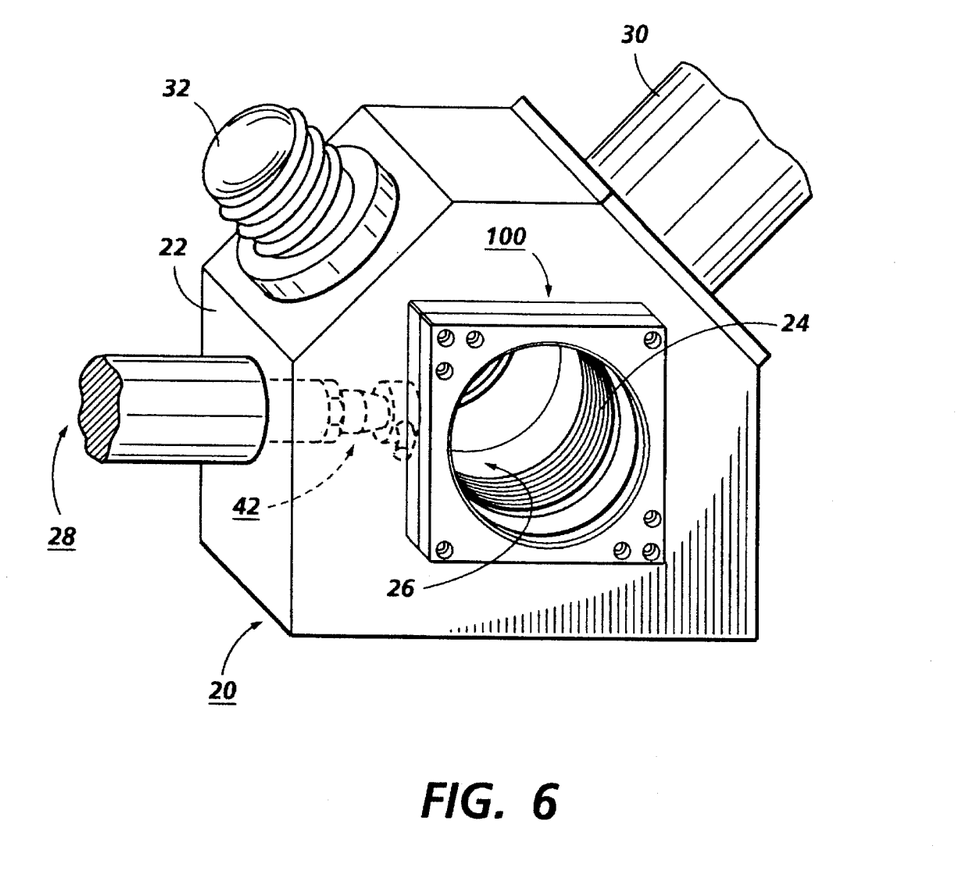
FIG. 6 shows a schematic, perspective view of the laser abalation capture system.
Figure 7:
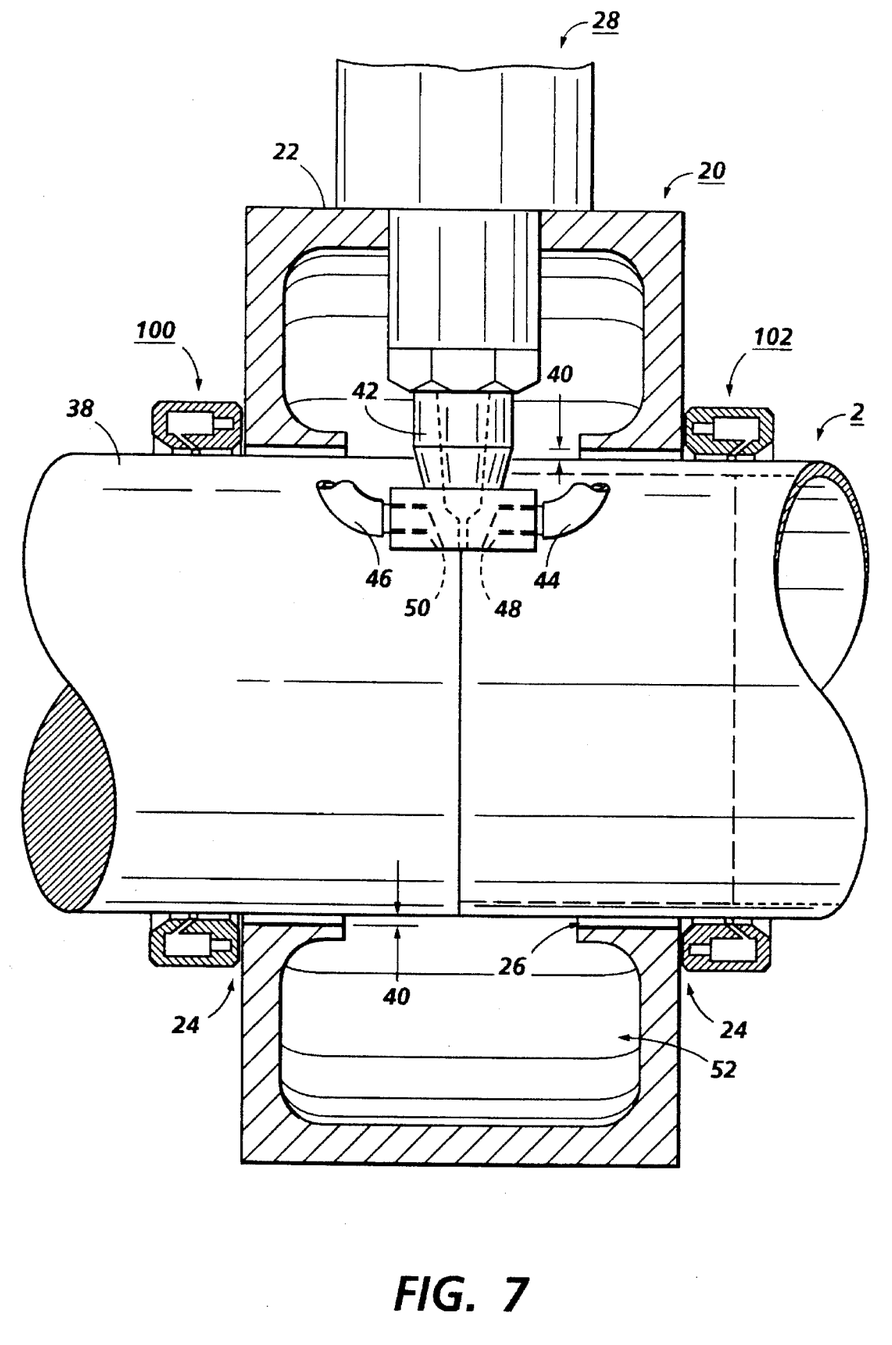
FIG. 7 illustrates a schematic, side, partial sectional view of one embodiment of the laser ablation capture system.

FIG. 6 illustrates a laser beam ablation capture apparatus 20 to accomplish the instant invention. The housing 22 defines an opening 24 in communication with a chamber 26, wherein the opening 24 and chamber 26 may receive a predetermined length of a photoreceptor (not shown). The housing 22 may enclose a length of the photoreceptor ranging for example from 5 to about 100%, and preferably from about 10 to about 20%. It is preferred that the chamber 26 extends completely through the housing 22 and be in communication with an opening (not shown) on the opposite side of opening 24. The housing 22 also may have a plurality of additional openings which can admit equipment to accomplish the instant invention including laser beam assembly 28 (which includes an ablation nozzle 42 as described herein), vacuum apparatus 30, and laser beam cooling apparatus 32. Laser beam ablation capture apparatus 20 also includes an annular fluid nozzle 100. As seen in FIG. 7, apparatus 20 further includes a second annular fluid nozzle 102, which is disposed on the opposite side of housing 22 at the opposite end of chamber 26. Annular nozzles (100,102) may be coupled to housing 22 by any suitable method and device including welding, nuts, bolts, screws, pins, and the like.

Both the vacuum apparatus 30 and the laser beam cooling apparatus 32 are well known to those skilled in the art. Suitable laser beam cooling apparatus 32 include for example a Rofin Sinar Beam Dump No. 825-1021-1. The vacuum apparatus 30 preferably reduces the pressure inside the housing 22 to a pressure ranging from about 0.5 to about 3 inches mercury, more preferably about 1 inch mercury.

FIG. 7 shows in more detail the apparatus of the instant invention. An end region of photoreceptor drum 2 is positioned in chamber 26 through the opening 24 of housing 22 and through the opening of the annular nozzle 102. The end of drum 2 is coupled to a rotating apparatus such as a drive spindle 38, which may be positioned in chamber 26 through opening 24 of housing 22 and through the opening of the annular nozzle 100. Drum 2 is spaced from the housing 22 by gap 40, preferably annularly-shaped, wherein the gap 40 is in communication with air outside the housing 22. A gap 40 is desirable to protect the coating on the drum 2 from contact with housing 22. The gap 40 may also exist between drive spindle 38 and nozzle 100 and between drum 2 and nozzle 102. The gap 40 may range in distance from about 0.10 mm to about 5 mm, and preferably from about 0.15 to about 2 mm, and especially about 0.25 mm. Laser beam assembly 28 is comprised of an ablation nozzle 42, laser beam apparatus (not shown), coaxial fluid stream apparatus (not shown), and cross-jet apparatus (44,46) (also referred to herein as "first fluid stream nozzle" and "third fluid stream means") which directs one or two cross-jets of fluid (also referred herein as "first fluid stream" and "third fluid stream"). The ablation nozzle 42 is coupled to the laser beam assembly 28 by any suitable method and apparatus including for example one or more of the following: a nut, a bolt, a screw, a clamping collar, and a retaining ring. Orifices (48,50) for the cross-jet fluids are indicated. In embodiments, the ablation nozzle 42 may be keyed to the laser beam assembly 28 to guarantee the correct angular orientation. For instance, there may be a notch or groove in the ablation nozzle 42 which is lined up with a pin in the laser beam assembly 28 so the nozzle 42 cannot move or rotate out of alignment. A pair of annular fluid nozzles (100,102), coupled to housing 22, directs annularly-shaped fluid streams towards the interior of housing 22 to keep cross-jet fluid and any coating debris entrained therein within the housing 22. The cross-jet fluid stream and the coaxial fluid stream may come from either an integrated nozzle as disclosed herein or from two or more separate nozzles.

The apparatus of FIG. 7 may be used to treat both end regions of drum 2 as follows: first cross-jet apparatus 44 directs a first cross-jet of fluid (not shown) against the coating during the ablation process, wherein coating debris may become entrained in the first cross-jet. Because of the direction of the first cross-jet toward the outboard end of the drum 2, fluid from the first cross-jet as well as coating debris contained in the first cross-jet fluid, may exit from the housing 22 through gap 40 in the absence of annular fluid nozzle 100; the annular fluid nozzle 100 directs fluid against the first cross-jet of fluid to propel any fluid from the first cross-jet and/or coating debris headed outside the housing 22 back towards the interior of the housing 22 into for example capture chamber 52, which may range in size from about 10 to about 50 cubic centimeters. An exhaust system (not shown) comprised of for instance vacuum apparatus may remove the coating debris and fluids from the first cross-jet and the annular nozzle 100. The exhaust system may in embodiments pull in air from outside housing 22 through gap 40, thereby minimizing the probability of coating debris escaping through gap 40. The housing 22 is preferably coupled to a carriage (not shown) for enabling movement of the laser beam ablation capture apparatus 20 to the opposite end region of the drum 2. At the opposite end region, the second cross-jet apparatus 46 directs a second cross-jet of fluid against the coating during the ablation process, wherein coating debris may become entrained in the second cross-jet. Because of the direction of the second cross-jet toward the outboard end of the drum 2, fluid from the second cross-jet as well as coating debris contained in the second cross-jet fluid, may exit from the housing 22 through gap 40 in the absence of the second annular fluid nozzle 102; the second annular fluid nozzle 102 directs fluid against the second cross-jet of fluid to propel any fluid from the second cross-jet and/or coating debris headed outside the housing 22 back towards the interior of the housing 22 into for example capture chamber 52 of the housing. An exhaust system (not shown) comprised of for instance vacuum apparatus may remove the coating debris and fluids from the second cross-jet and the second annular nozzle 102. In a preferred embodiment, the pair of annular nozzles (100,102) is in operation at the same time. This may prevent escape of coating debris from either end of chamber 26.

In embodiments of the present invention, second cross-jet apparatus 46 and second annular fluid nozzle 102 are optional. To ablate both ends of the photoreceptor where the second cross-jet apparatus 46 and the second annular fluid nozzle 102 are absent, one end is first ablated as described herein, the drum is withdrawn from the housing and turned around, and the second end is then inserted into the housing 22 for ablation.

Figure 8A:
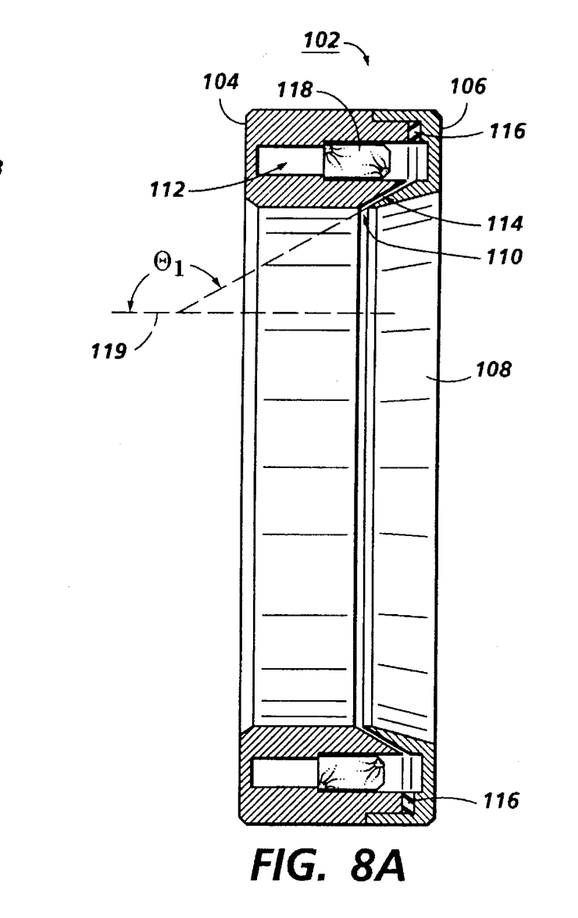
FIG. 8A illustrates a side, cross-sectional view of an annular nozzle.

FIG. 8A illustrates a side, cross-sectional view of the annular nozzle 102 (annular nozzle 100 may have the same or similar configuration as disclosed herein for nozzle 102). The annular nozzle 102 is comprised of a first nozzle housing 104 coupled to a second nozzle housing 106. An opening 108 extends through nozzle 102. An orifice 110 defined by first nozzle housing 104 and second nozzle housing 106 is annularly disposed around the opening 108 and is in communication with the opening 108. The first nozzle housing 104 and the second nozzle housing 106 define a fluid passageway 112 which is annularly disposed around the opening 108, wherein the fluid passageway 112 is in communication with the orifice 110. The portion 114 of the fluid passageway 112 that is adjacent to the orifice 110 (also referred to as "channel 114") has an angle $\theta_1$ with respect to the surface of the drum 2 (represented by line 119). Angle $\theta_1$ is further described herein with respect to FIG. 9 and may be any effective value for allowing an annularly-shaped fluid stream from the annular nozzle 102 to prevent cross-jet fluid, coaxial fluid, and/or coating debris from escaping into the air outside the laser ablation capture system. An annularly-shaped gasket 116, made from for example rubber, is disposed between the first nozzle housing 104 and the second nozzle housing 106 to prevent fluid leakage from the fluid passageway 112 into ambient air. In embodiments, an optional annularly-shaped porous material 118 may be disposed in fluid passageway 112. The porous material 118 may contact the inner walls of the nozzle 102 to form a fluid permeable barrier. The purpose of the porous material is to ensure that the fluid such as air in the passageway is of a desired pressure to enter channel 114. Below the desired pressure, the fluid is generally prevented by the porous material from entering channel 114. At the desired pressure, the fluid passes through the porous material 118 into channel 114 to exit from orifice 110. A specific desired pressure may ensure that there is significant fluid flow from orifice 110 to prevent escape of the coating debris from the capture apparatus. In embodiments, the fluid in the annular nozzle may have a pressure ranging for example from 80 to about 200 psi, and preferably from about 100 to about 150 psi. The porous material may be fabricated from for example a plastic foam such as open cell foam. Preferred porous materials include polypropylene and nylon.

Figure 8B:
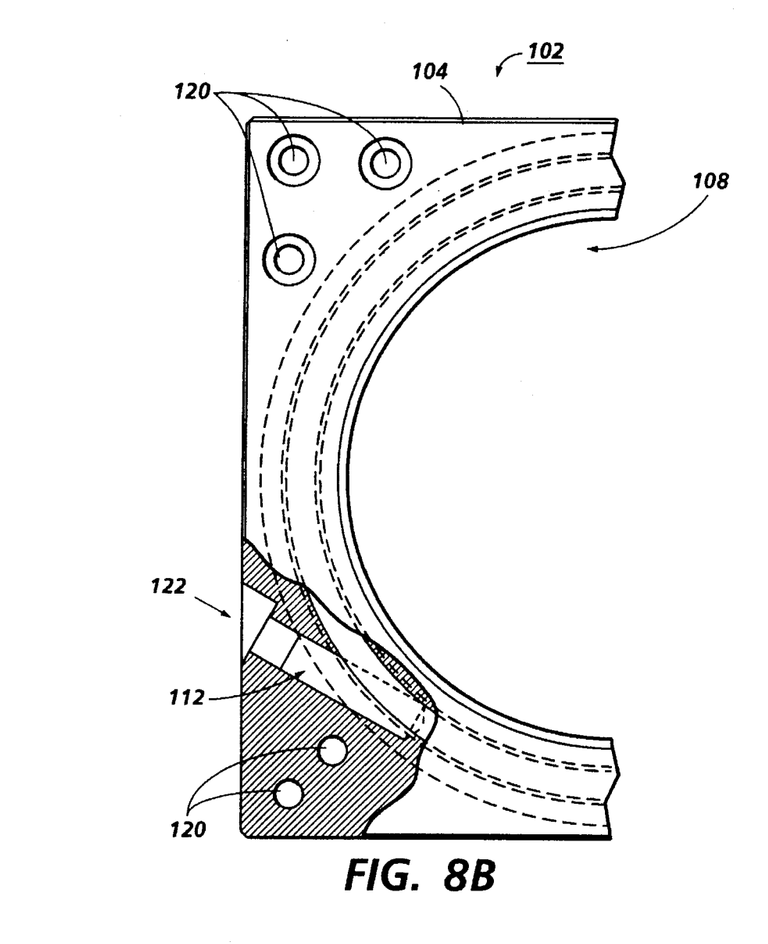
FIG. 8B illustrates a plan, partial, front view of the annular nozzle.

FIG. 8B illustrates a plan, partial, front view of the annular nozzle 102. Annular nozzle 102 is comprised of a plurality of mounting holes 120 for coupling the first nozzle housing 104 and the second nozzle housing (not shown), and for coupling the annular nozzle 102 to the capture system housing (not shown). The nozzle 102 defines a fluid inlet aperature 122 which is in communication with the fluid passageway 112.

The annular nozzle has the following illustrative dimensions: an opening 108 having a diameter which may range for example from about 50 to about 300 mm, and preferably from about 100 to about 200 mm; the annular orifice 110 having a width which may range for example from about 0.1 to about 10 mm, and preferably from about 0.5 to about 5 mm, and especially about 1 mm; the annular orifice 110 having a diameter which may range for example from about 50 to about 300 mm, and preferably from about 100 to about 200 mm; the channel 114 having a cross-sectional length (as seen in FIG. 8A) which may range for example from about 5 to about 70 mm, and preferably from about 10 to about 40 mm; the fluid passageway 112 having a cross-sectional length (as seen in FIG. 8A, excluding the cross-sectional length of channel 114) which may range for example from about 20 to about 150 mm, and preferably from about 40 to about 100 mm; the fluid passageway 112, excluding the channel 114, having a circumferential length which may range for example from about 100 to about 500 mm, and preferably from about 200 to about 300 mm; the channel 114, having a circumferential length which may range for example from about 100 to about 500 mm, and preferably from about 200 to about 300 mm; the fluid passageway 112 including the channel 114 having a volume which may range for example from about 50 to about 200 cc, and preferably from about 100 to about 150 cc. The first nozzle housing and the second nozzle housing may be fabricated by for example machining from any suitable material, preferably a metal such as steel, aluminum, iron, copper, brass, and the like.

The annular fluid nozzle (100,102) directs an annularly-shaped stream of a fluid at the cross-jet fluid at a pressure ranging for example from about 50 to about 300 psi, preferably 70 to about 150 psi, and especially about 80 psi. The speed of the fluid as it escapes from the annular fluid nozzle is preferably from about 100 to about 250 meters/second, and more preferably from about 150 to about 200 meters/second, to overcome any detrimental components of turbulence from the cross-jet and/or coaxial fluid. The annular fluid nozzle (100,102) directs an annularly-shaped fluid stream against the cross-jet fluid stream at an angle $\theta_1$ ranging for example from about 90 to about 120 degrees, preferably from about 100 to about 110 degrees, and especially about 100 degrees, the angle $\theta_1$ being measured between the annularly-shaped fluid stream and the surface of drum 2. The annularly-shaped fluid stream from annular nozzle 100 may be directed at the same or different angle $\theta_1$ as the annularly-shaped fluid stream from annular nozzle 102.

Figure 9:
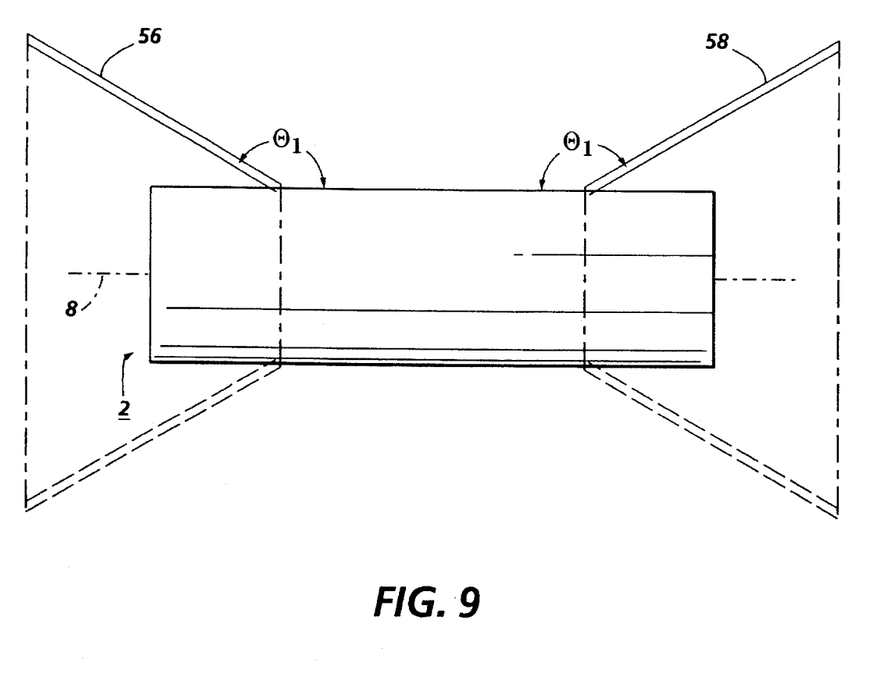
FIG. 9 illustrates the direction of the annular-shaped fluid stream.

FIG. 9 illustrates the determination of angle $\theta_1$, wherein angle $\theta_1$ is between the annularly-shaped fluid stream (56, 58) and the surface of drum 2.

The distance between the orifice of the annular fluid nozzle (100,102) and the outer surface of drum 2 may range for example from about 1 to about 20 mm, preferably about 3 to about 10 mm, and especially about 5 mm. The distance between the annular fluid nozzles (100,102) preferably ranges from about 80 to about 200 mm, and more preferably from about 100 to about 130 mm, based on the distance between the annularly-shaped orifices. The distance between the center of the coaxial fluid orifice of the ablation nozzle and the annular nozzle may range for example from about 15 to about 35 mm, preferably from about 20 to about 30 mm, and especially about 25.4 mm, based on the length of an imaginary line parallel to the longitudinal axis of drum 2, from the center of the coaxial fluid orifice to the middle of the width of the annular nozzle orifice. The distance between the annular nozzle 100 and the corresponding cross-jet orifice 48 (as well as between the annular nozzle 102 and the corresponding cross-jet orifice 50) may range for example from about 15 to about 40 mm, preferably from about 20 to about 30 mm, and especially about 28 mm, based on the length of an imaginary line parallel to the longitudinal axis of drum 2, from the center of the cross-jet orifice to the middle of the width of the annular nozzle orifice. The distance between the bottom of the ablation nozzle and the photoreceptor surface may range for example from about 0.3 to about 2 mm, preferably from about 0.5 to about 1 mm, and expecially about 0.5 mm. The fluid employed for the annular fluid nozzle may be any suitable fluid or gas such as air disclosed herein and may be the same or different fluid from the cross-jet. The gas being utilized in the instant invention preferably should be filtered prior to use to remove undesirable particles.

Figure 10:
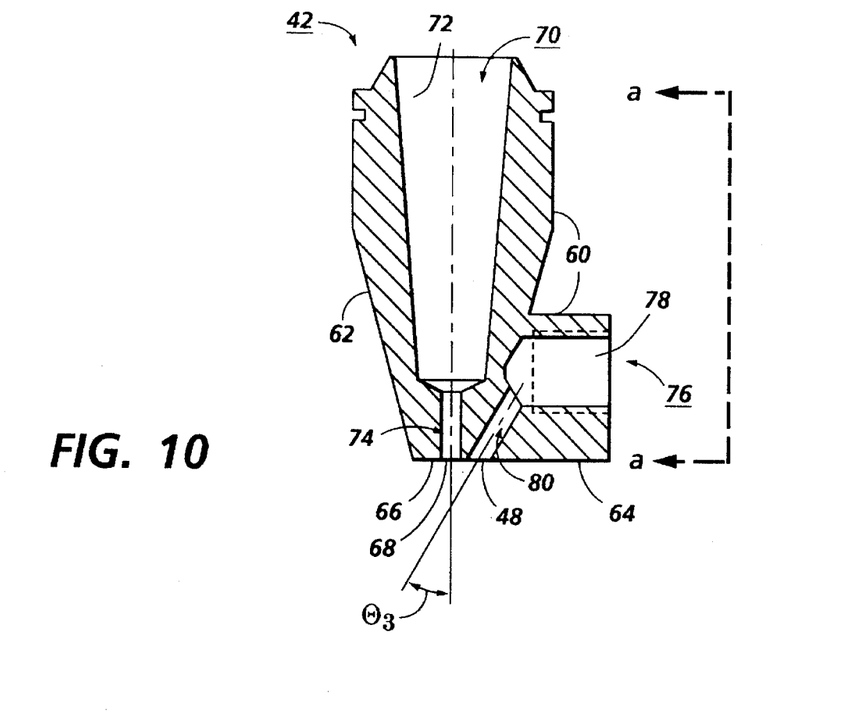
FIG. 10 illustrates a cross-sectional, front view of an ablation nozzle.

FIG. 10 illustrates a front, cross-sectional view of a preferred laser ablation nozzle 42. Nozzle 42 is comprised of a housing 60 having a generally conical portion 62 for passage of a laser beam and coaxial fluid, and an integral side portion 64 for passage of one, two or more cross-jet fluids. The side portion 64 may be coupled to the conical portion 62 by for example welding and/or by mechanical fastening devices such as screws, nuts, and/or bolts, and the like. Preferably, housing 60 is a single piece wherein conical portion 62 and the side portion 64 are formed from the same block of material such as by machining, whereby no welding seams, or mechanical fastening devices are present. The housing 60 may be fabricated from any suitable material such as a metal including for example copper, steel, aluminum, iron, alloys thereof, and the like. A preferred metal is copper tungsten (class 10). The housing 60 has a bottom surface 66 preferably flat or level. A laser beam/coaxial fluid orifice 68 is defined by the bottom surface 66. A first cross-jet orifice 48 is defined by the bottom surface 66. A laser beam/coaxial fluid passageway 70 defined by the conical portion 62 is in communication with the laser beam/coaxial orifice 68. The laser beam/coaxial fluid passageway 70 is comprised of a chamber or cavity 72, preferably having tapered walls and a smaller channel 74 having preferably parallel walls. A first cross-jet passageway 76 defined by the housing 60 is in communication with the first cross-jet orifice 48. The first cross-jet passageway 76 is comprised of a chamber 78 and a narrower channel 80 which is angled with respect to the channel 74 of the laser beam/coaxial fluid passageway 70. Channel 80 and channel 74 may have any suitable angle $\theta_3$ between them effective for ablation of layered material, ranging for example from 25 to about 40 degrees, preferably 30±1 degrees and 35±1 degrees, and especially 30 degrees and 35 degrees. In embodiments, an angle of 30 degrees may be preferred for thinner coatings such as ranging for example from about 0.2 mm to about 1 mm. This may be because the molten coating, when affected by the coaxial fluid, form a circular wave around the laser beam incidence point. It was discovered that more materials achieved better removal because the wave was higher and thus better removed by the cross-jet fluid. As the coating thickness was reduced, a cross-jet fluid angle greater than 30 degrees may remove less coating material.

In a preferred embodiment, the integral side portion 64 includes a second passageway 82 (shown in FIG. 11) for passage of a second cross-jet. The second cross-jet passageway 82 is in communication with a second cross-jet orifice 50 defined by the bottom surface 66 of the housing 60. The second cross-jet passageway 82 is comprised of a chamber 84 and a narrower channel 86, wherein the channel 86 is angled with respect to the channel 74 of the laser beam/coaxial fluid passageway 70. The angle ($\theta_4$) between the laser beam/coaxial fluid channel 74 and the channel 86 of the second cross-jet passageway 82 may be a value as disclosed herein for the angle ($\theta_3$) between laser beam/coaxial fluid channel 74 and the channel 80 of the first cross-jet passageway 76, and the two angles may be the same or different value.

Figure 11:
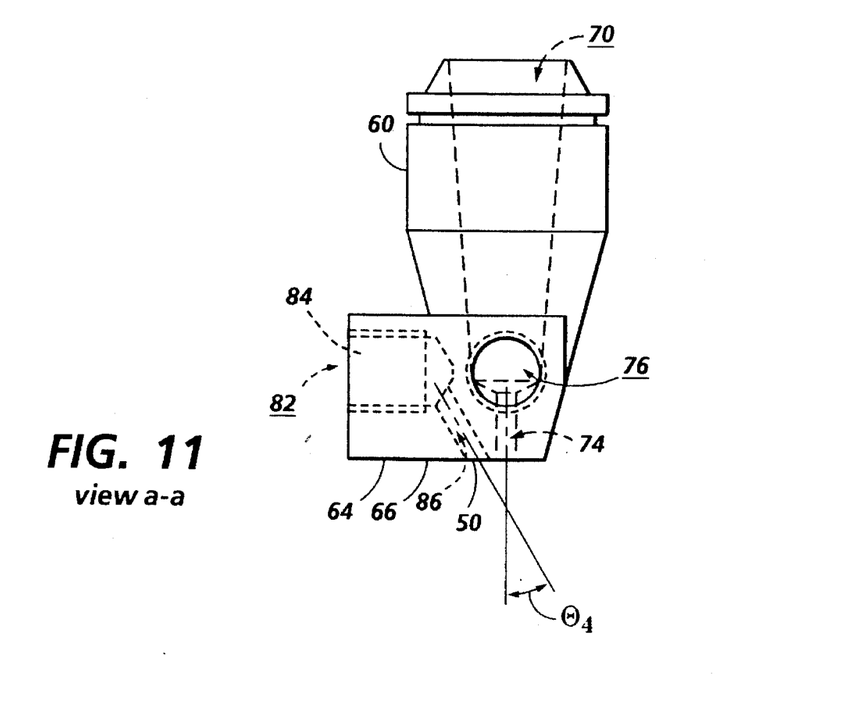
FIG. 11 illustrates a schematic, side projection of section a—a of the ablation nozzle of FIG. 10.

FIG. 11 discloses a schematic, side projection of section a—a of the nozzle of FIG. 10. There are disclosed the first cross-jet passageway 76, the second cross-jet passageway 82, and the laser beam/coaxial fluid passageway 70.

Figure 12:
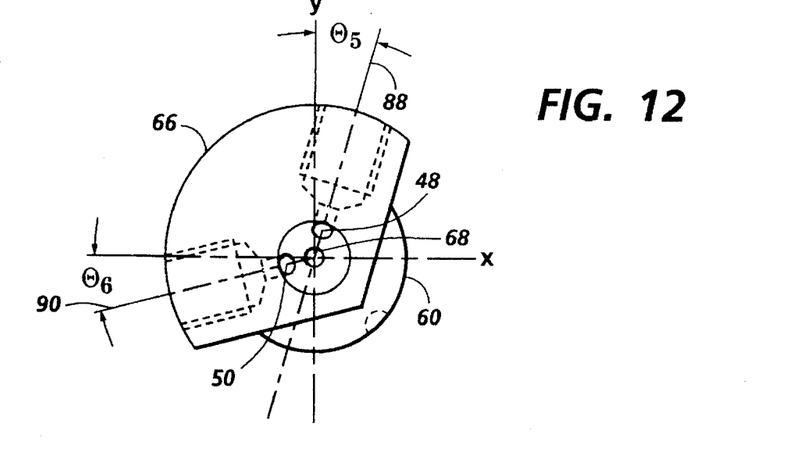
FIG. 12 illustrates a bottom view of the bottom surface of an ablation nozzle.

FIG. 12 discloses the bottom surface 66 of housing 60 where there are present a laser beam/coaxial fluid orifice 68 and the first cross-jet orifice 48, and the second cross-jet orifice 50. To define the orientation of the orifices (48,50, 68), imaginary perpendicular lines x and y bisect laser beam/coaxial fluid orifice 68. Imaginary line 88 bisects both laser beam/coaxial fluid orifice 68 and first cross-jet orifice 48, forming an angle ($\theta_5$) between line y and line 88. Imaginary line 90 bisects both laser beam/coaxial fluid orifice 68 and second cross-jet orifice 50, forming an angle ($\theta_6$) between line x and line 90. Angles $\theta_5$ and $\theta_6$ may be the same or different from one another, and may range for example from 0 to about 60 degrees, and preferably from 0 to about 15 degrees. The configuration of FIG. 12 may be used in the ablation of for example cylindrical photoreceptors having an outside diameter of 40 mm.

Figure 13:
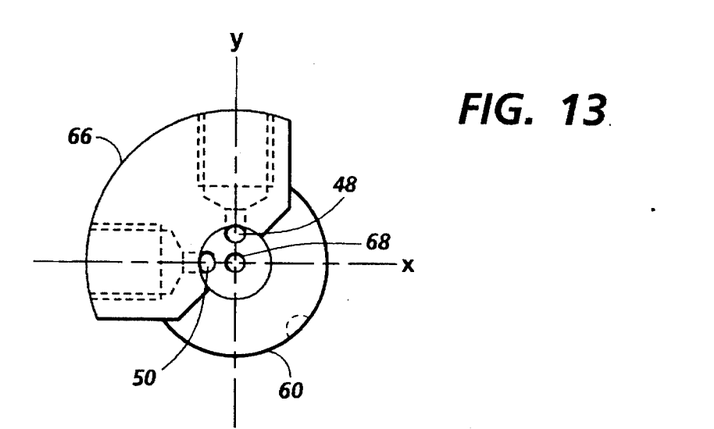
FIG. 13 illustrates a bottom view of the bottom surface of an alternative embodiment of the abalation nozzle.

FIG. 13 discloses a preferred orientation of the orifices (48,50,68) on the bottom surface 66 wherein the three orifices (48,50,68) form a 90 degree angle, i.e., angles $\theta_5$ and $\theta_6$ are 0 degrees. The cross-jet orifices (48,50) are spaced from the laser beam/coaxial fluid orifice at the same or different distances ranging for example from about 0.5 mm to about 10 mm, preferably from about 1 mm to about 5 mm, and especially about 3 mm, based on a distance between the centers. The configuration of FIG. 13 may be used in the ablation of for example cylindrical photoreceptors having an outside diameter of 84 mm.

Figure 14:
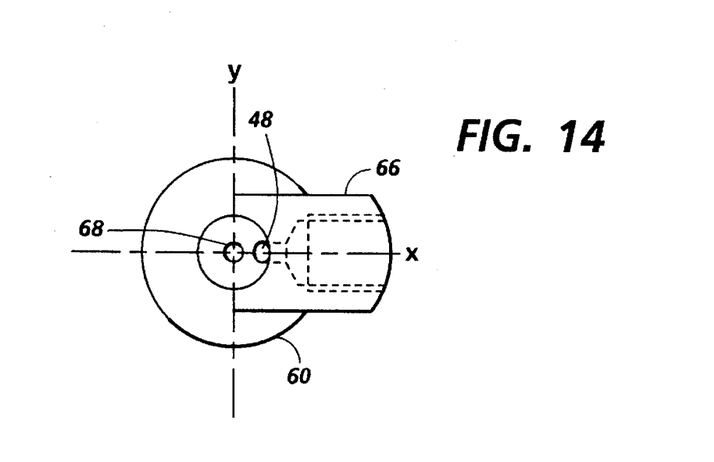
FIG. 14 illustrates a bottom view of another embodiment of the ablation nozzle.

FIG. 14 discloses a bottom surface 66 of a housing 60 wherein there is a laser beam/coaxial fluid orifice 68 and only one cross-jet orifice 48 having an orientation, configuration, and dimensions as described herein. Preferably, orifices (48,68) are bisected either by line x or by line y, although cross-jet orifice 48 may be disposed at other suitable angles.

The bottom surface of the housing preferably is smooth having no depressions, protrusions, or openings, except for the orifices described herein. The bottom surface is preferably flat, but may be curved or slanted in embodiments. The surface area of the bottom surface may range for example from about 20 to about 100 square millimeters, and preferably from about 40 to about 70 square millimeters, excluding the surface area of the orifices. In embodiments, a portion of the surface area of the bottom surface, ranging from about 20 to about 60%, preferably from about 30 to about 40%, is radially disposed within 5 mm of the center of the laser beam/coaxial fluid orifice. It is preferred that a portion of the surface area of the bottom surface ranging from about 20 to about 50 square millimeters is radially disposed within 5 mm of the center of the laser beam/coaxial fluid orifice.

The orifices for the cross-jets and the laser beam/coaxial fluid orifice may be of any suitable size ranging for example from about 0.5 to about 5 mm, preferably from about 1 to about 2 mm, and may be of any suitable shape such as oval or circular.

The various passageways of the housing may be of any effective dimension and shape. The chamber 72 of the laser beam/coaxial fluid passageway may have a rounded, tapered shape and may have the following dimensions: a length ranging for example from about 10 to about 50 mm, and preferably from about 15 to about 30 mm; and a cross-sectional dimension ranging for example from about 10 to about 40 mm, and preferably from about 20 to about 30 mm. The channel 74 of the laser beam/coaxial fluid passageway may have a rounded shape and may have the following dimensions: a length ranging for example from about 5 to about 30 mm, and preferably from about 10 to about 20 mm; and a cross-sectional dimension ranging for example from about 5 to about 20 mm, and preferably from about 10 to about 15 mm. The chamber (78,84) of the first and second cross-jet passageways may have a rounded shape and may have the following dimensions: a length ranging for example from about 5 to about 30 mm, and preferably from about 10 to about 20 mm; and a cross-sectional dimension ranging for example from about 5 to about 20 mm, and preferably from about 10 to about 15 mm. The channel (80,86) of the first and second cross-jet passageways may have a rounded shape and may have the following dimensions: a length ranging for example from about 5 to about 30 mm, and preferably from about 10 to about 20 mm; and a cross-sectional dimension ranging for example from about 5 to about 20 mm, and preferably from about 10 to about 15 mm.

The ablation nozzle having integrated coaxial and cross-jet passageways preferably has all the optimal process parameters machined into it to eliminate any variation in ablation quality. Integration of the coaxial and cross-jet passageways minimize or eliminate the effect of vibrations which may change the angles of the various fluid streams to one another and to the photoreceptor. Where the coaxial and the cross-jet passageways are disposed in two separate nozzles, vibration may change the pertinent angles. The ablation nozzle may be quickly uncoupled for maintenance or changeover. The shape, and bottom flatness of the ablation nozzle, along with the position of the ablation nozzle to the photoreceptor all impact the dynamics of the ablation, and minor modifications to the shape of the ablation nozzle or position may cause significant degradation to ablation quality. It is believed that the coaxial fluid stream and the cross-jet fluid stream, along with the rotation of the photoreceptor, cause the fluids to become distributed underneath the ablation nozzle disclosed herein, thus forming a film of fluid, which prevents redeposition of the ablated coating debris back onto the ablated section of the photoreceptor, while the molten coating material is being moved off the photoreceptor by the cross-jet fluid.

The invention will now be described in detail with respect to specific preferred embodiments thereof, it being understood that these examples are intended to be illustrative only and the invention is not intended to be limited to the materials, conditions or process parameters recited herein.

EXAMPLES 1–9

Laser Ablation of Photoreceptor Coating

Several photoreceptors are prepared by coating cylindrical substrates. A base coating layer is formed using isopropyl alcohol and butanol solvents, and a randomized copolymer. A middle coating layer is formed using a binder resin and dibromoanthanthrone pigment. A top coating layer is formed using a chlorobenzene solvent, a polycarbonate binder resin and a diamine transport molecule. The photoreceptors have an outside diameter of 84 mm.

The photoreceptors are treated according to the process of the invention. A continuous wave $CO_2$ laser is used. The laser provides a laser beam having a diameter of 0.0058 inches after focusing. The laser's focus latitude is about ±0.75 mm from the point of sharp focus. The photoreceptors are mounted in a chucking device, rotated, and the laser beam is impinged on a peripheral end of each of the photoreceptors to remove different widths of coatings. The exhausting system employs a vacuum having a pressure of 1 inch mercury. The coaxial fluid, the cross-jet fluids, and the annularly-shaped fluid are air.

A single piece ablation nozzle, having an integrated coaxial passageway and two cross-jet passageways, is used. The following dimensions and orientations are used: for the cross-jet fluid streams, angle $\theta°$ is 30 degrees and angle $\theta_7$ is 45 degrees; for the annularly-shaped fluid stream, angle $\theta_1$ is 100 degrees; for the ablation nozzle, angle $\theta_3$ is 30 degrees and $\theta_4$ is 35 degrees; for the ablation nozzle, angle $\theta_5$ is 45 degrees and angle $\theta_6$ is 20 degrees; the distance between the center of the coaxial orifice and the orifice of the annular fluid nozzle is 25.4 mm; the distance between the orifice of the annular nozzle and the surface of the photoreceptor is 9.5 mm; the distance between the flat bottom of the ablation nozzle and the photoreceptor surface is 0.5 mm; and the distance of 24.9 mm is between a first centerline through the laser beam/coaxial fluid passageway and a second centerline, parallel to the first centerline, which bisects the photoreceptor (when the photoreceptor is viewed through an end).

| Treatment conditions are varied as follows: | | | | | | | |
|---|---|---|---|---|---|---|---|
| Example | Laser Power (W) | Spindle Speed (rpm) | Traverse Speed (ipm) | Coax Gas (psi) | X-Jet Gas (psi) | Time (sec) | Annular Jet Gas (Psi) |
| 1 | 1500 | 4000 | 5.5 | 100 | 300 | 4 | 800 |
| 2 | 1500 | 4000 | 3.88 | 100 | 300 | 6 | 600 |
| 3 | 1700 | 4000 | 5.5 | 60 | 300 | 4 | 700 |
| 4 | 1700 | 4000 | 11 | 60 | 300 | 2 | 600 |
| 5 | 1700 | 4000 | 22 | 100 | 300 | 1 | 500 |
| 6 | 1500 | 2000 | 5.5 | 100 | 300 | 4 | 500 |
| 7 | 1900 | 4000 | 5.5 | 100 | 300 | 4 | 500 |
| 8 | 1900 | 2000 | 22 | 100 | 200 | 1 | 400 |
| 9 | 1500 | 4000 | 8.5 | 80 | 200 | 3 | 400 |

The treatments result in a satisfactory removal of all of the coating layers from a peripheral end of the photoreceptor. In addition, coating debris is prevented from redepositing on the imaging area and from escaping into the air outside the ablation apparatus. Most of the photoreceptors do not require further treatment, as all of the coating in the treated region is removed by a single pass of the laser beam. A partial or complete second pass with the laser beam can be carried out to remove any residual coating material left behind by the first pass of the laser beam. The translation speed of the laser beam can be slowed down on the second pass if greater laser energy is needed to remove the residual coating material.

The invention thus provides a process for successfully removing at least part and preferably all of the coating layers at selected areas such as the inner and/or outer peripheral ends of a photoreceptor. The laser ablation and heat processes eliminate the need to chemically or mechanically treat an ablated photoreceptor coating. The invention eliminates the need for masking of the photoreceptor ends during the coating process. In dip coating processes, the invention eliminates the conventional bottom edge wipe step. The process simplifies the manufacture of photoreceptors, facilitates automation, produces higher product yields, and requires few moving mechanical parts. The invention minimizes the rate of solvent usage and the amount of solvent waste.

Other modifications of the present invention may occur to those skilled in the art based upon a reading of the present disclosure and these modifications are intended to be included within the scope of the present invention.

We claim:

1. A method comprising:
   (a) enclosing a portion of the length of a coated substrate in a housing to result in an enclosed coated substrate portion, wherein there exists a gap between the enclosed substrate portion and the housing and the gap is in communication with air outside the housing;
   (b) directing radiation at the coating of the enclosed substrate portion;
   (c) directing a first fluid stream against the coating of the enclosed substrate portion to remove at least part of the coating in the form of coating debris during or subsequent to (b), whereby the first fluid stream moves a portion of the coating debris outside the housing in the absence of (d);

(d) directing an annularly-shaped second fluid stream against the first fluid stream in a direction effective for keeping the coating debris inside the housing, thereby minimizing movement of the coating debris into the air outside the housing;

(e) exhausting the coating debris;

(f) directing a coaxial fluid stream which is coaxial with the radiation during (b); and (g) rotating the substrate during (b).

2. The method of claim 1, wherein (a) comprises enclosing the portion of the length of a cylindrical photoreceptor in the housing.

3. The method of claim 1, wherein (a) comprises enclosing the end region of a cylindrical coated substrate in the housing.

4. The method of claim 1, wherein (c) comprises directing the first fluid stream against the coating at a pressure ranging from about 100 to about 400 psi.

5. The method of claim 1, wherein (d) comprises directing the second fluid stream against the first fluid stream at a pressure ranging from about 50 to about 300 psi.

6. The method of claim 1, wherein (d) comprises directing the second fluid stream consisting of an annularly-shaped gas jet against the first fluid stream.

7. The method of claim 1, wherein (d) comprises directing the second fluid stream against the first fluid stream at an angle $\theta_1$ ranging from about 90 to about 120 degrees, the angle $\theta_1$ being measured between the second fluid stream and the surface of the substrate.

8. The method of claim 7, wherein (d) comprises directing the second fluid stream against the first fluid stream at the angle $\theta_1$ ranging from about 100 to about 110 degrees.

9. The method of claim 7, wherein (d) comprises directing the second fluid stream against the first fluid stream at the angle $\theta_1$ of about 100 degrees.

10. The method of claim 1, wherein step (e) comprises reducing air pressure within the housing to remove away the coating debris, and thereby drawing air from outside the housing into the housing.

* * * * *